(12) United States Patent
Tetradis

(10) Patent No.: US 7,686,260 B1
(45) Date of Patent: Mar. 30, 2010

(54) LAWN AND LEAF BAG HOLDER

(76) Inventor: Mike Tetradis, 9801 Huntingdon La., St. Louis, MO (US) 63123

(*) Notice: Subject to any disclaimer, the term of this patent is extended or adjusted under 35 U.S.C. 154(b) by 298 days.

(21) Appl. No.: 11/636,674

(22) Filed: Dec. 11, 2006

(51) Int. Cl.
*A63B 55/08* (2006.01)

(52) U.S. Cl. ............................. 248/98; 248/95; 248/97; 248/99; 248/100

(58) Field of Classification Search .................. 248/95, 248/99, 100, 101, 98
See application file for complete search history.

(56) References Cited

U.S. PATENT DOCUMENTS

| | | | | |
|---|---|---|---|---|
| 1,183,124 A | * | 5/1916 | Schwalen | 248/95 |
| 1,350,443 A | * | 8/1920 | Edstrom | 248/97 |
| 1,922,938 A | * | 8/1933 | Elliott | 248/97 |
| 3,388,919 A | | 6/1968 | Waag | |
| 3,875,981 A | | 4/1975 | Brenner et al. | |
| 4,304,378 A | * | 12/1981 | Briggs | 248/97 |
| 4,336,951 A | | 6/1982 | Crothers | |
| 4,398,689 A | * | 8/1983 | Prader | 248/99 |
| 4,697,835 A | | 10/1987 | Scott | |
| 4,749,158 A | | 6/1988 | Buckley | |
| 4,863,125 A | * | 9/1989 | Bateman | 248/97 |
| 4,998,694 A | * | 3/1991 | Barteaux | 248/100 |
| 5,048,778 A | | 9/1991 | Wright | |
| 5,802,807 A | | 9/1998 | Johnson | |
| 5,997,061 A | * | 12/1999 | Langley | 294/1.1 |
| 6,152,408 A | * | 11/2000 | O'Grady | 248/100 |
| 6,585,304 B1 | | 7/2003 | Boozer et al. | |
| 6,722,672 B2 | | 4/2004 | Cates et al. | |
| 6,726,156 B1 | * | 4/2004 | Scola | 248/95 |
| 6,874,797 B2 | | 4/2005 | Gardenour | |

* cited by examiner

*Primary Examiner*—Amy J Sterling
(74) *Attorney, Agent, or Firm*—Kevin L. Klug

(57) ABSTRACT

A lawn and leaf bag holder apparatus and method of use and manufacture comprising an arm holder and at least a pair of arms which are capable of holding a bag in an upright and open position. The bag holder adjusts to and holds a plurality of bag mouth sizes via elastic or spring separation, and provides for easy transport with a cart or dolly and easy storage especially for partially filled bags. The bag holder is especially suited for conventional biodegradable and recyclable lawn and leaf bags used to store or dispose of lawn or garden clippings or debris.

14 Claims, 11 Drawing Sheets

LAWN AND LEAF BAG HOLDER

BACKGROUND OF THE INVENTION

The art of the present invention relates to lawn and garden devices in general and more particularly to a lawn and leaf bag holder and attachable cart or dolly which uniquely holds a bag, preferably a lawn and leaf bag, in an upright and open position. The present art further provides easy, convenient, and environmentally friendly storage and transport of lawn and garden or other debris with a mounting bracket attached with a structure with or a cart or dolly.

Homeowners and gardeners are continually collecting accumulated debris, especially organic material such as grass trimmings, leaves, or tree branches, which are often placed in a conventional environmentally friendly paper lawn and garden bag. Use of the aforesaid biodegradable bags allows the homeowner or gardener to easily compost, recycle, or properly dispose of the undesired accumulated debris. Obviously, the quantity of lawn and garden debris which requires collection is substantially increased during the tree leaf shedding and peak lawn grass growing seasons.

Unfortunately, bags utilized for lawn and garden debris are often difficult to hold open and maintain in an upright position when filling with said debris. This is especially true for a single person who tries to hold said bag upright and open and fill it contemporaneously. The present art provides a unique bag holder having spring or elastically loaded arms which are sized to fit easily within the mouth of a disposable bag, hold open said mouth, and further mount (with said bag) upon a cart, dolly, or bracket for transport or storage. In a preferred embodiment, the art of the present invention is especially useful with conventional biodegradable lawn and leaf bags which are manufactured from paper or cardboard and have a mouth of substantially rectangular cross section. Alternative embodiments may utilize holders having arms of various shapes whereby bags having elliptical, circular, or other square cross sectional mouths or openings may be utilized.

The art of the present invention allows a user to easily maintain an open bag mouth, partially or fully fill said bag, and also store or transport the bag and its contents. Also unique to the bag holder of the present art is the mounting hook system which allows the user to mount the bag holder upon a bracket for storage of a partially filled bag or mount upon a cart or dolly for transport. The present art feature of versatility is especially useful when a user partially fills a bag and desires to wait until further debris fully fill the bag before disposal, recycling, or composting.

Accordingly, an object of the present invention is to provide a lawn and leaf bag holder and method of manufacture and use which easily and conveniently holds a bag open and upright during a filling operation.

Another object of the invention is to provide a lawn and leaf bag holder and method of manufacture and use which provides easy and convenient storage and removal of a partially filled bag prior to disposal, recycling, or composting.

Another object of the invention is to provide a lawn and leaf bag holder and method of manufacture and use which provides easy transport of partially or fully loaded bags, especially when overly heavy or bulky.

A further object of the present invention is to provide a lawn and leaf bag holder and method of manufacture and use which provides all of the aforesaid benefits and is usable by a single person without the help of others.

SUMMARY OF THE INVENTION

To accomplish the foregoing and other objects of this invention there is provided a lawn and leaf bag holder and method of manufacture and use which allows easy and convenient opening, holding, loading, storing, removal, and transporting of bags, especially conventional biodegradable lawn and leaf bags. Alternative embodiments of the apparatus and method of use are adaptable to bags of any size, shape, or material.

When fully opened, conventional lawn and leaf bags form a cube like structure having a typical height of approximately 35 inches, a width of approximately 16 inches, and a depth of approximately 12 inches. As with any bag, the base is substantially closed and the mouth is substantially open with both substantially having the dimensions of said width and depth. That is, the mouth represents a substantially rectangular opening of approximately 16 by 12 inches. When fully opened, the conventional lawn and leaf bag has an internal rectangular cube like interior for debris or waste storage.

Since said conventional lawn and leaf bags are typically manufactured from a thin paper or cardboard material, the bag is not self supporting. That is, in a slight wind the bag will easily blow over or the mouth will deform during filling whereby further debris cannot be introduced into the bag cavity. Use of the present art assures that said bag is maintained and held in an upright position with said mouth fully open and capable of receiving debris, compost, yard waste, or trash without deforming said mouth or the three dimensional rectangular form of the bag itself.

In contemplation for use with said conventional bag, the preferred embodiment of the present art comprises a bag holder having a pair of arms mounted upon an arm frame, one or more of said arms are pivotable on said arm frame, preferably on a shaft integral with or mounted with said arm frame, and one or more torsion springs providing a separating bias for one or more of said arms to maintain said bag mouth in an open position. Said arm frame further has one or more, preferably two, mounting hooks which mate with one or more mounting holes on or within a mounting bracket. Said mounting bracket may be attached with or mounted to a structure (especially for storage) or a cart or dolly for transport.

In a preferred embodiment, the length of said arms is substantially similar or equivalent to said bag depth and said arm frame is substantially similar or equivalent to said bag width. When inserted into a bag mouth, said spring loaded or biased arm(s) assure a frictional hold of said bag and, due to the close dimensional equivalency, maintain the substantially rectangular opening of said mouth whereby said bag may be easily filled.

The combination arm frame and arms are preferably sized to fit within the mouth of said bag and hold said mouth in an open position. Alternative embodiments and methods of use may utilize the bag holder with a plurality of mouth sizes. This is especially true since the equivalent circumferential perimeter, i.e. the arms in combination with the arm frame and arm separation, increases as the arms expand. Once inserted, said arm frame with its attached hook(s) may hold said bag with a bracket mounted upon a structure or a cart or dolly.

The art of the present invention may be manufactured from a plurality of materials including but not limited to metals, including steels, stainless steels, titanium, aluminum, and alloys thereof, plastics, composites, fiberglass, woods, carbon fibers, and various resins.

BRIEF DESCRIPTION OF THE DRAWINGS

Numerous other objects, features and advantages of the invention should now become apparent upon a reading of the following detailed description taken in conjunction with the accompanying drawings, in which.

DETAILED DESCRIPTION

Figure 1:
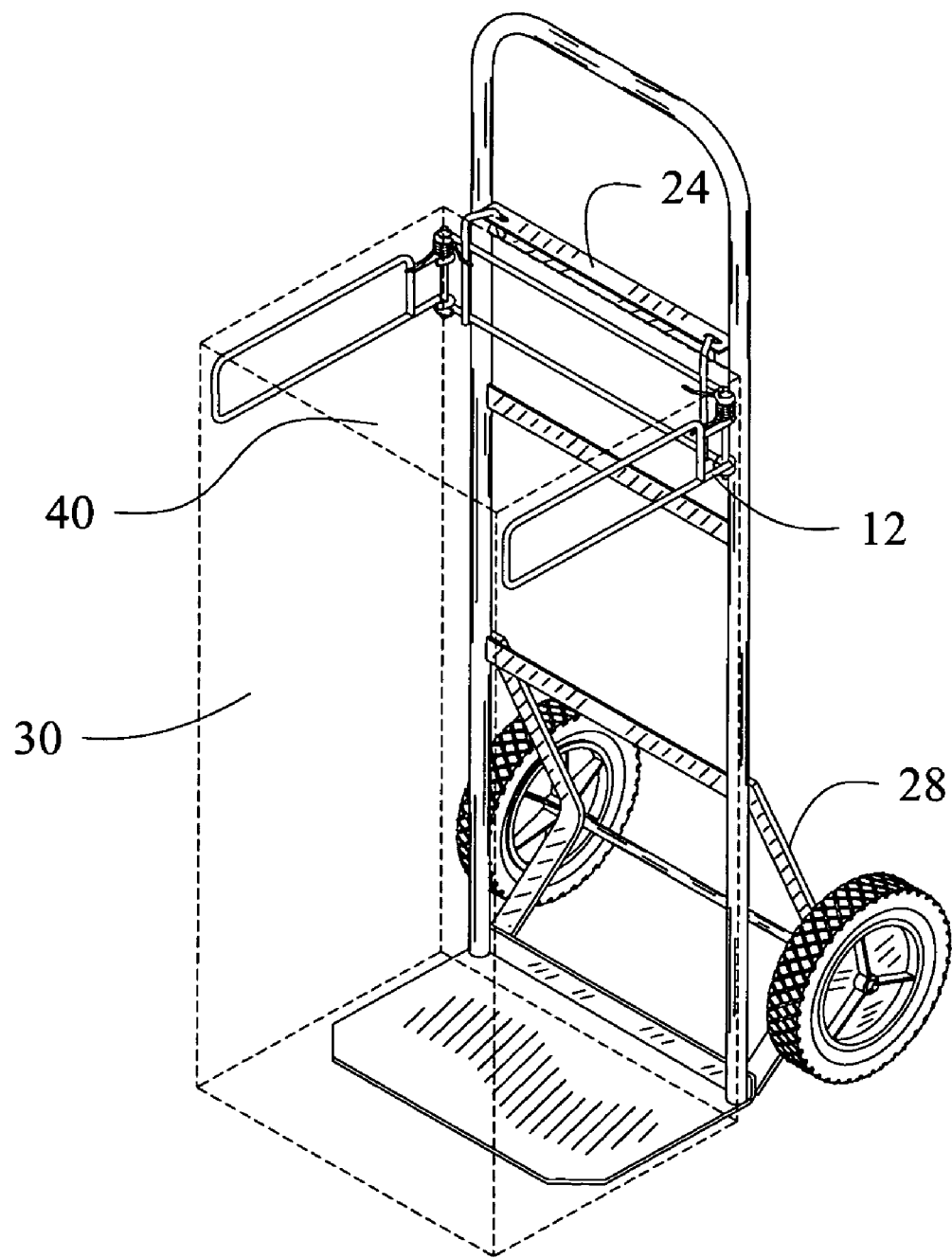
FIG. 1 is a perspective view of a lawn and leaf bag holder mounted upon a cart with a bag shown in phantom.
Figure 2:
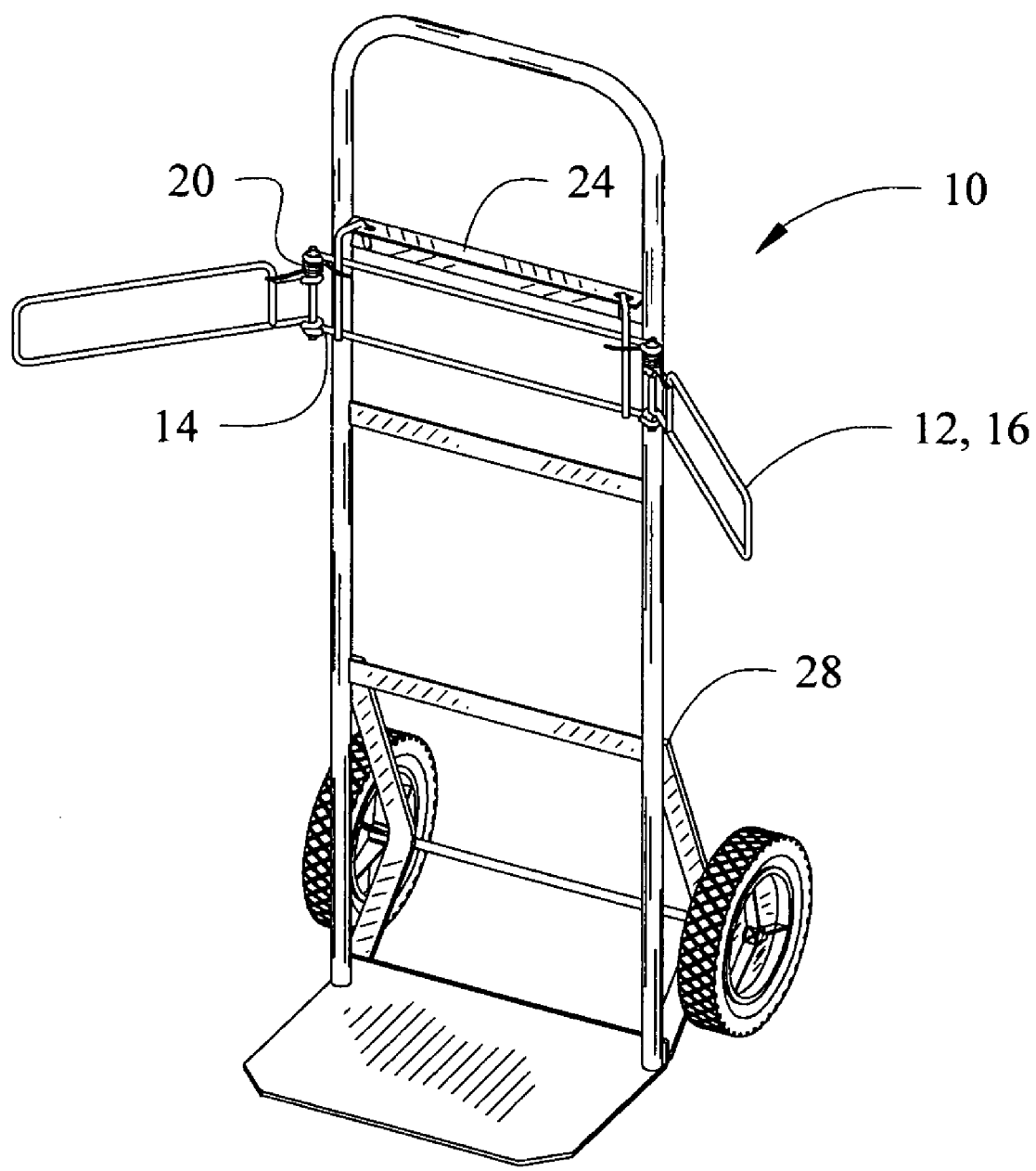
FIG. 2 is a perspective view of a lawn and leaf bag holder mounted upon a cart without a bag.
Figure 3:
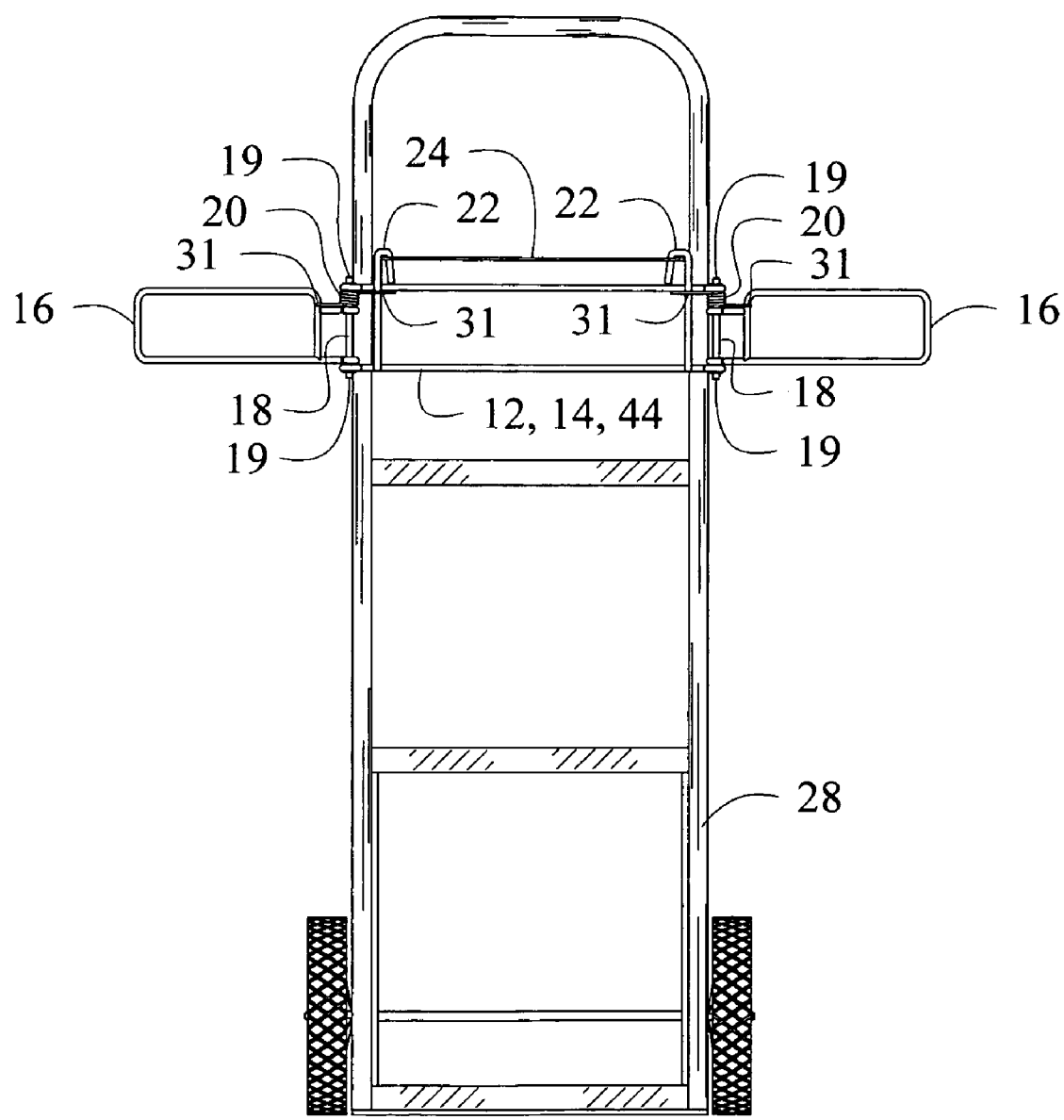
FIG. 3 is a front side plan view thereof.
Figure 4:
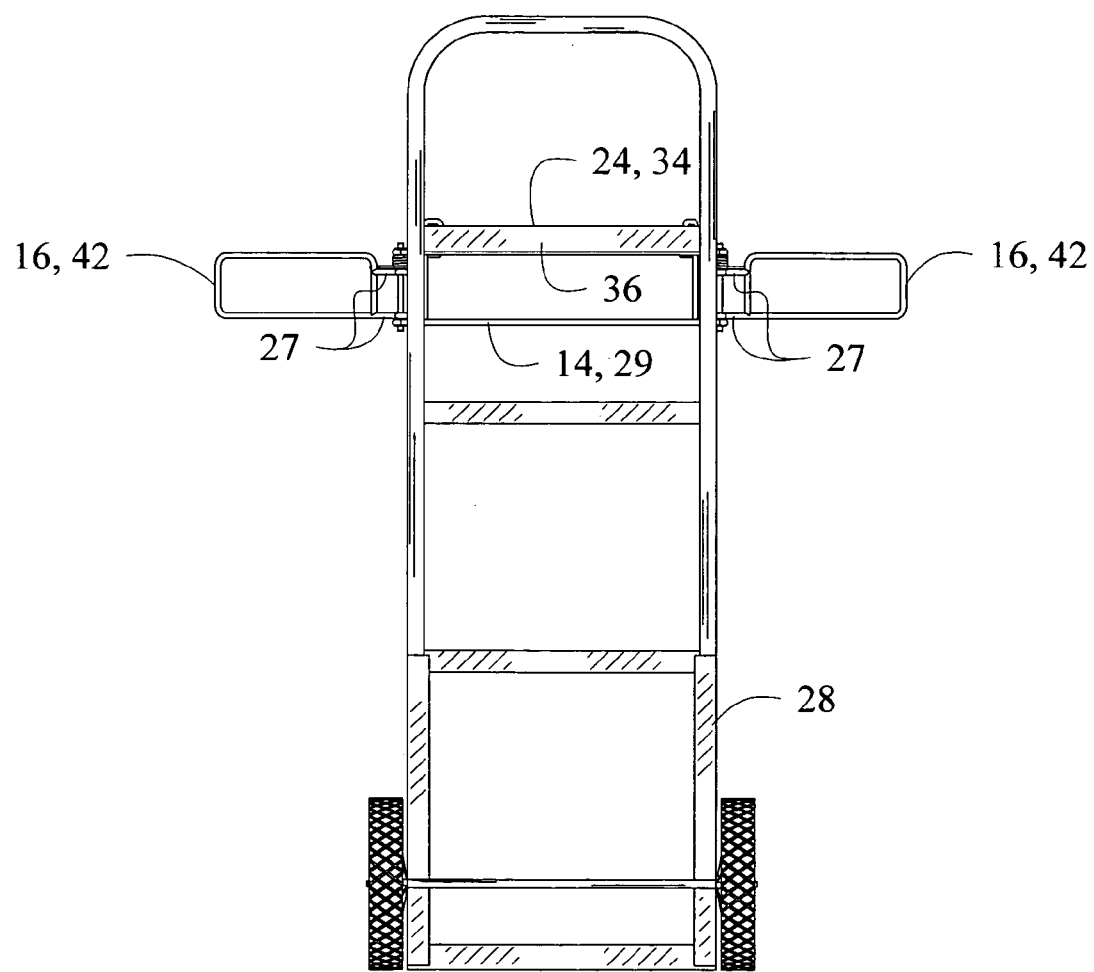
FIG. 4 is a rear side plan view thereof.
Figure 5:
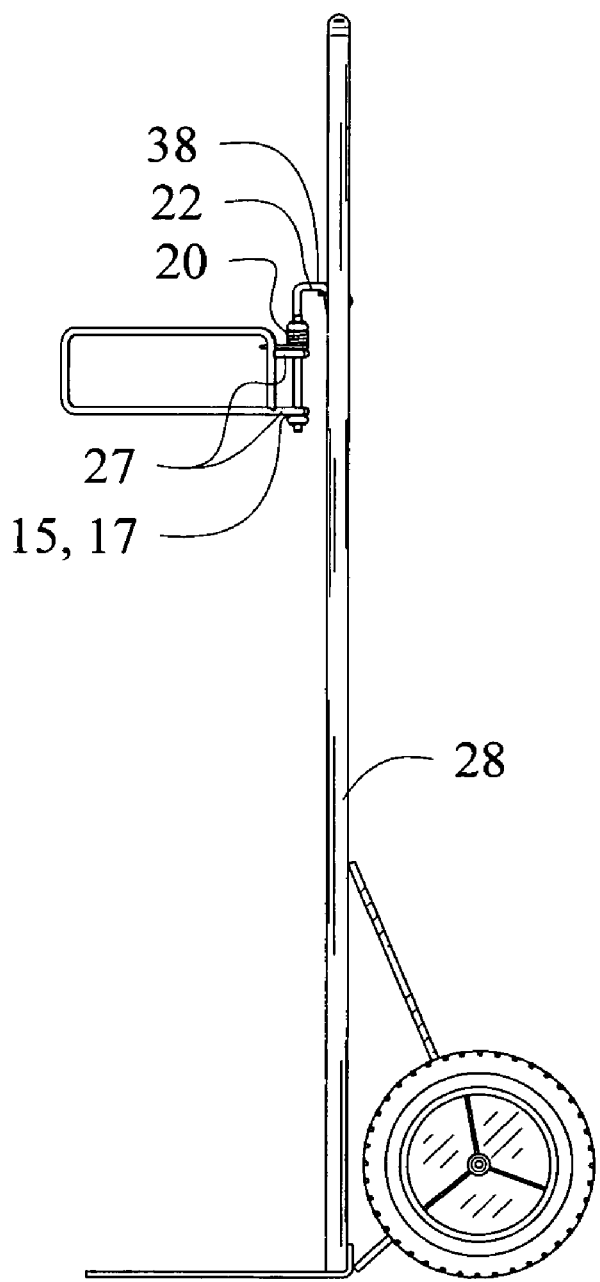
FIG. 5 is a left side plan view thereof, the right side being substantially similar thereto.
Figure 6:
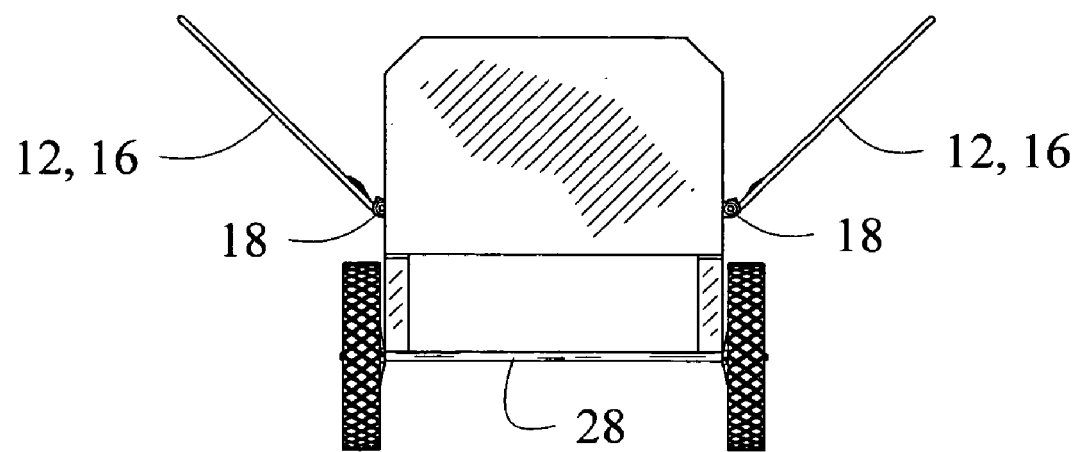
FIG. 6 is a bottom side plan view thereof.
Figure 7:
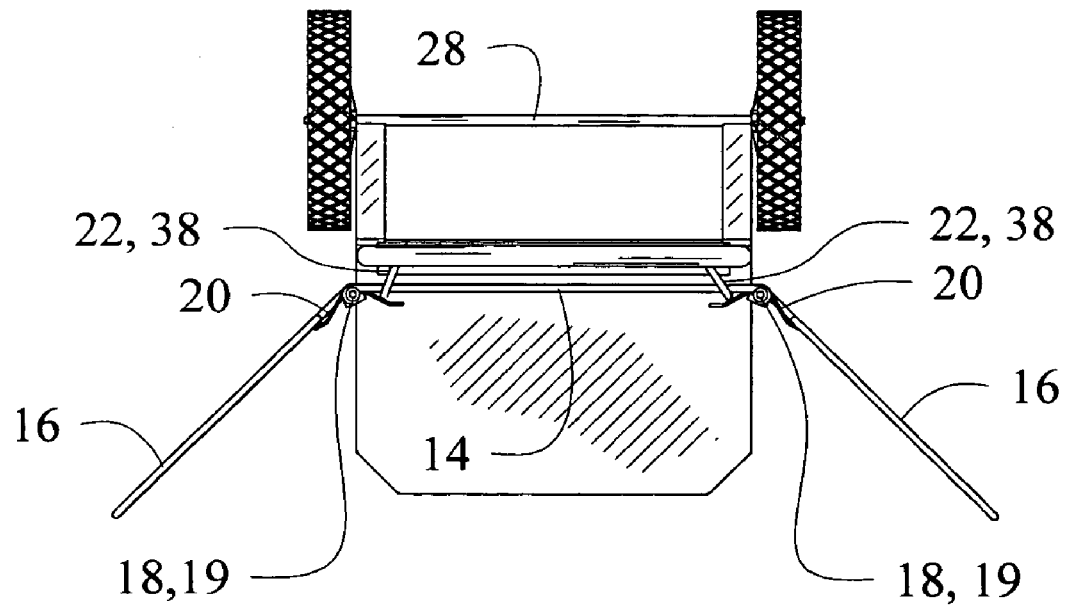
FIG. 7 is a top side plan view thereof.
Figure 8:
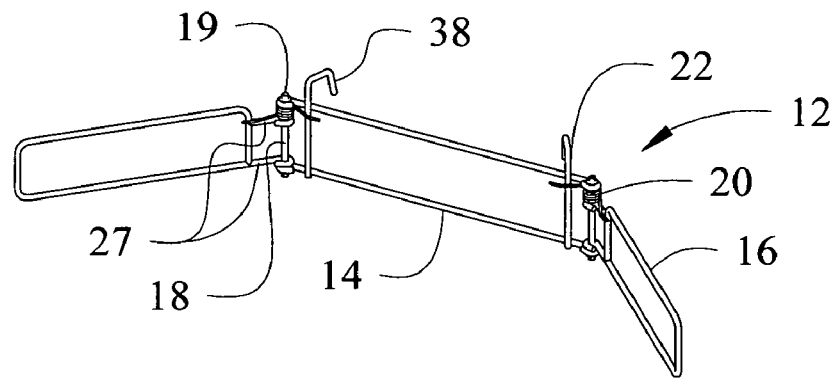
FIG. 8 is a perspective view of a preferred embodiment of the bag holder of the lawn and leaf bag holder.
Figure 9:
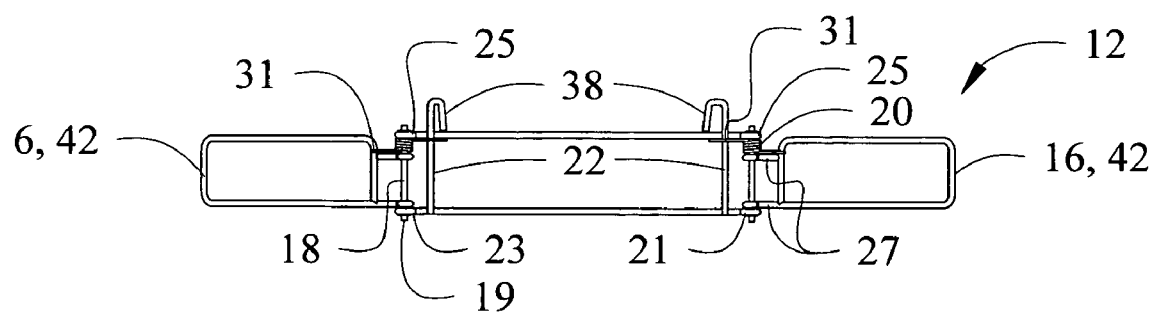
FIG. 9 is front plan view of the preferred embodiment of the bag holder.
Figure 10:
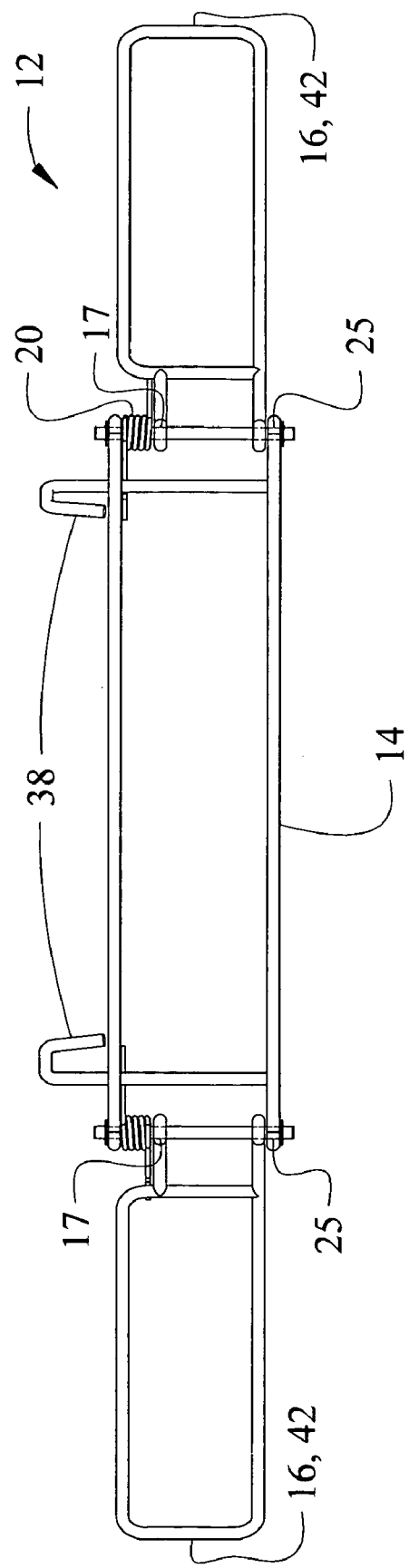
FIG. 10 is a rear plan view of the preferred embodiment of the bag holder.
Figure 11:
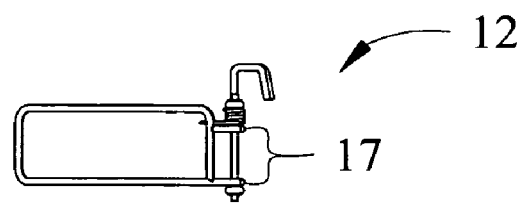
FIG. 11 is a left side plan view of the preferred embodiment of the bag holder, the right side plan view being substantially similar thereto.
Figure 12:
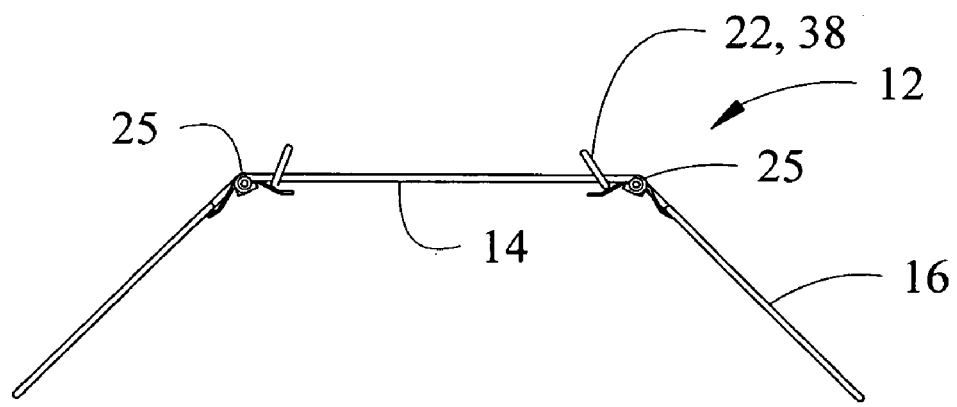
FIG. 12 is a top plan view of the preferred embodiment of the bag holder.
Figure 13:
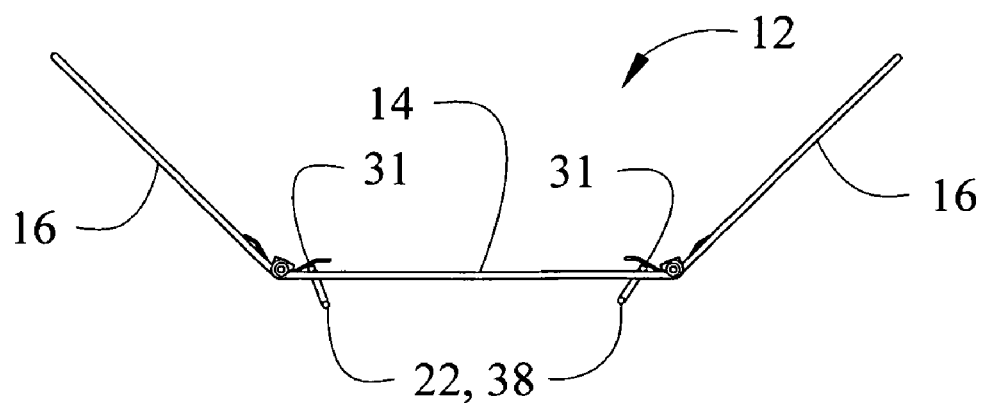
FIG. 13 is a bottom plan view of the preferred embodiment of the bag holder.
Figure 14:
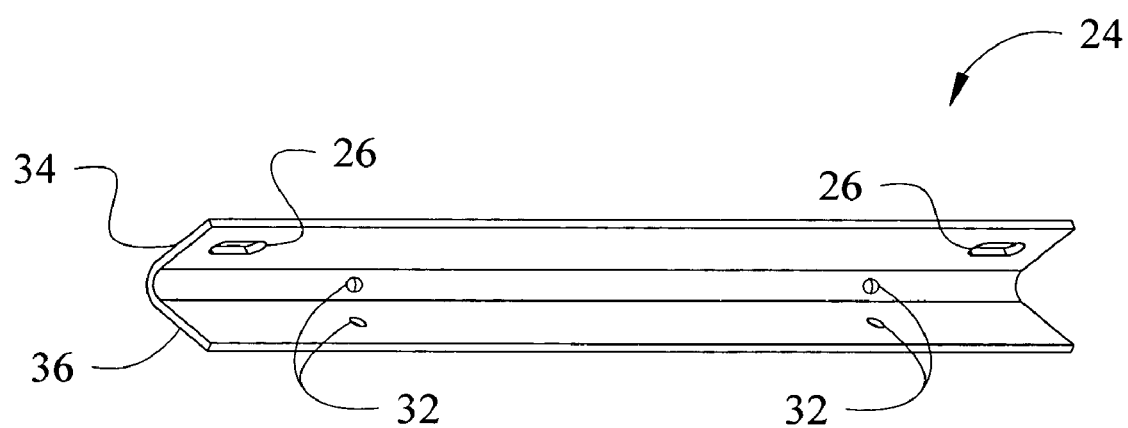
FIG. 14 is a perspective view of the preferred mounting bracket.
Figure 15:
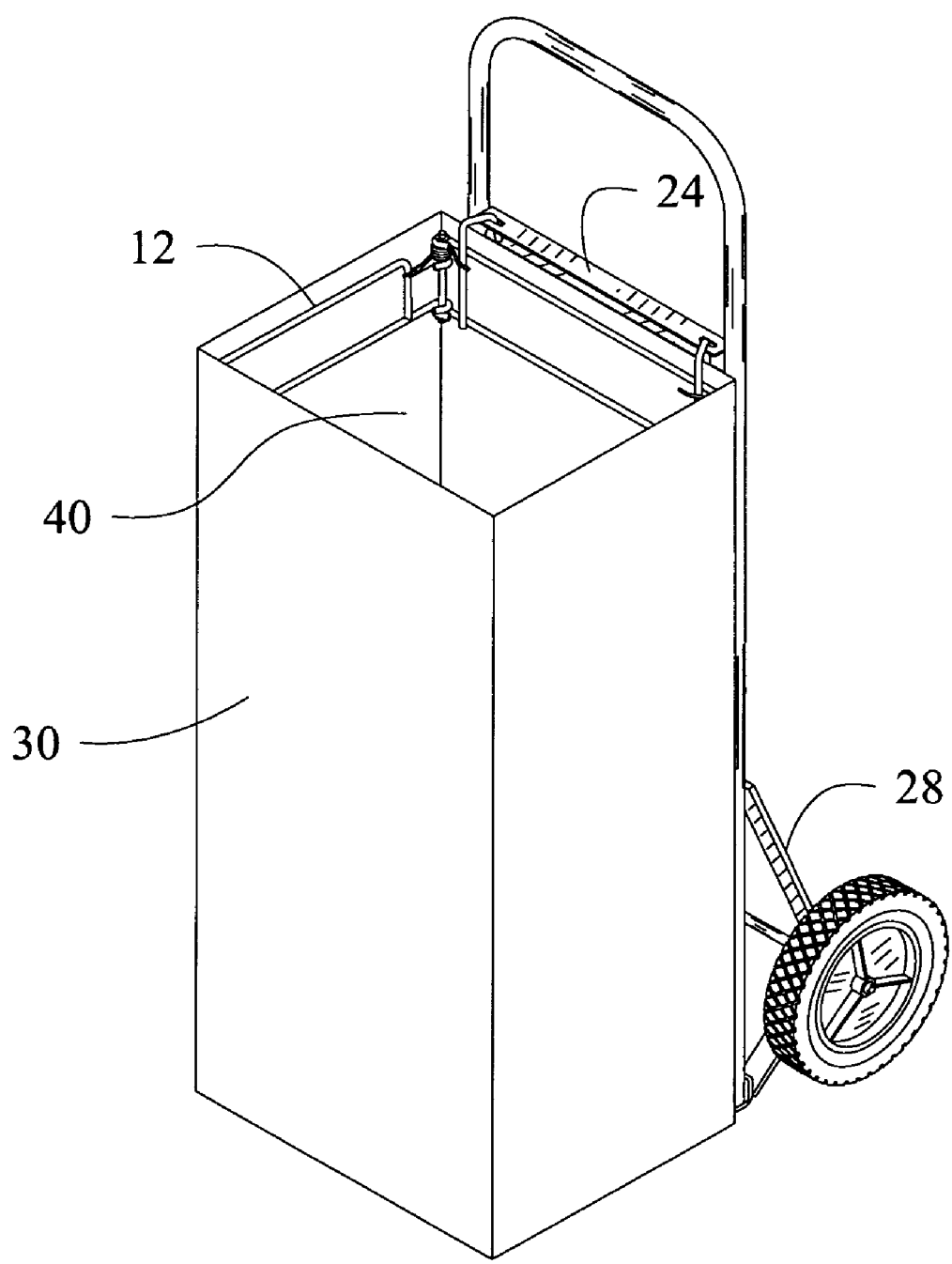
FIG. 15 is a perspective view of a lawn and leaf bag holder mounted upon a cart with a bag as in FIG. 1 with the bag not shown in phantom.

Referring now to the drawings, there is shown in FIGS. 1-12 a preferred embodiment of a lawn and leaf bag holder 10. The art of the present invention represents a unique bag holder 12 and associated mounting bracket 24 which, in a preferred embodiment, collectively form the lawn and leaf bag holder 10. Alternative embodiments may forego use of the associated mounting bracket 24 and mount said bag holder 12 directly with or onto a structure or cart or dolly 28. The art is especially useful with conventional biodegradable lawn and leaf bags 30.

In the preferred embodiment, the lawn and leaf bag holder 10 comprises a bag holder 12 having an arm frame 14 from which extends two arms 16 mounted therewith, each arm 16 having a first end 15 and a second end 42. Said arm frame 14 and arms 16 are each preferably manufactured from round stock and formed into a substantially rectangular form. Alternative embodiments may manufacture said arm frame 14 or arms 16 from a plurality of stock or molded materials, including but not limited to single or multi-piece solid, hollow or formed sheet stock, moldings, or extrusions. Said alternative embodiments may further form said arm frame 14 or arms 16 into a plurality of shapes other than the preferred substantially rectangular form including but not limited to circular, elliptical, or multi-faceted shapes.

In the preferred embodiment, each arm 16 pivots or expands and is preferably attached with said arm frame 14 via a pivot shaft 18 having a shaft retainer 19 on each end to retain and secure placement. That is, on each first end 15 (arm first end 15) of said arms 16 is one or more arm bores 17 and on each first 21 (frame first end 21) and second 23 (frame second end 23) end of said arm frame 14 is one or more frame bores 25, all of which mate with said pivot shaft 18 and allow the arms 16 to pivot or expand relative to said arm frame 14. Alternative embodiments may utilize only one pivoting arm 16 and another arm 16 which is substantially fixed with said arm frame 14. Further alternative embodiments may utilize one or more minimally or non-pivoting arms 16 which substantially linearly extend or expand, via a elastic separator bias, connected from or with said arm frame 14 or said first 21 or second 23 ends.

In a preferred embodiment, said bores 17, 25 are formed via shaping said round stock into a substantially circular form of a substantially similar internal diameter as the pivot shaft 18 diameter. Alternative embodiments may form said bores 17, 25 via holes drilled within the material utilized for said arm frame 14 and arms 16 or may further utilize bushings or bearings which mate with said pivot shaft 18. Said pivot shaft 18 is preferably a separate shaft which mates with said bores 17, 25 but may also be formed integrally with said arm frame 14 or arms 16.

In the preferred embodiment, each of said arms 16 has a narrowed height portion 27 near said first end 15 whereby a spring 20 may fit between and engage said arm frame 14 and said arms 16 without substantially interfering with the contour of the arms 16 or bag holder 12. That is, in a preferred embodiment, the spring 20 is a torsional spring having extensions which compressively seat with said arm frame 14 and arms 16 on a seat surface 31 and is placed over (i.e. the open center of said spring 20) said pivot shaft 18. Preferably said seat surface 31 is an integral part of the arm frame 14 (formed via the mounting hooks 22 extending the height of the arm frame 14) and the arm 16 (formed via the round stock transitioning and forming into said narrowed height portion 27) structure but may also be formed in a plurality of ways whereby said spring 20 imparts a spreading force to said arms 16. Alternative embodiments may utilize a plurality of spring forms including but not limited to coils springs, leaf springs, torsion bars, or elastic bands in either compression or tension. Collectively, said spring 20 and the plurality of alternative spring forms are referred to as an elastic separator which biases and couples with or is connected to said arm frame 14 and arm 16 to provide a separating force between said arms 16. Alternative embodiments may further place said narrowed height portion 27 on said arm frame 14 instead of or in addition to said arms 16 or forego use altogether.

The preferred embodiment has one or more, preferably two, mounting hooks 22 which form part of the structure of said arm frame 14. Preferably said mounting hooks 22 extend from and are mounted with the front 44 or rear 29 of said arm frame 14 and mate with mounting holes 26 within a mounting bracket 24. Said mounting hooks 22 allow the bag holder 12 to removably attach, couple, or mate with and hold onto or with said mounting bracket 24 secured to a structure or cart or dolly. The removability feature allows partially filled bags 30 to be stored and allows for easy disposal, recycling, or composting of the filled bag. Although capable of many forms, the mounting bracket 24 is a substantially 90 degree angle material having mounting holes 26 through which said mounting hooks 22 feed and mate in the preferred form. That is, the top plane 32 of said angle material has said holes 26 through which said hooks 22 feed and contact with or seat upon the back plane 34 of said angle material. For a cart or dolly 28 mounting, this bracket 24 fits and is attached between the main uprights of the cart 28. (preferably via welds or other fastener means) For storage, the bracket 24 has one or attachment holes 32 within said back plane 36, between said back plane 36 and said top plane 34, or even in said top plane 34 through which a screw or other fastener may be placed for secure mounting to a structure. Alternative embodiments may also utilize other structure mounting methods including but not limited to clamps, straps, or adhesives. Said mounting hooks and the other mounting methods are collectively referred to as mounts.

Said mounting hooks 22 preferably are mounted near but not at said first 21 and second 23 ends of said arm frame 14 and preferably on the front 44 or rear 29. Also, said mounting hooks 22 preferably extend substantially the full height of said arm frame 14 whereby they further serve as said seat surfaces 31 for said spring 20. Said hooks 22 preferably have a substantially "U" shaped end extending above said arm frame 14. Unique to the mounting hook 22 configuration of the preferred embodiment art is the hook end 38 cant away from parallel with the plane of the arm frame 14 plane. That is, the hook end 38 preferably cants in such a fashion that when contacting with or seated upon the back plane 34 of said angle material through said mounting holes 26, it maintains said arms 16 in a position which assures that said bag 30 remains substantially vertical.

In the preferred embodiment, the aforesaid elements are assembled with said pivot shaft 18 holding said arms 16 pivotably with said arm frame 14 and said springs 20 providing a separating force within the mouth 40 of said bag 30 in order to hold said mouth 40 open. Alternative embodiments may fix a single arm 16 to said arm frame 14 via welds or other fasteners and pivot another arm 16 on said shaft 18 with said spring 20 separating force, provided the force is substantially effective at holding the mouth 40 of said bag 30. Further alternative embodiments may attach said arms 16 externally to said mouth 40 in order to provide the present art fitting function.

Unique to the present invention is the ability of the arm frame 14 in combination with the arms 16 to accommodate, fit, and hold bags 30 having mouths 40 of various sizes or circumferences. As an example, if the arm frame 14 has a length "x" between the mounting locations of said arms 16 and each arm has a length "$y_1, y_2$" respectively, and an inside angle between a first arm 16 and said arm frame 14 is "$\alpha_1$," and an inside angle between a second arm 16 and said arm frame 14 is "$\alpha_2$", then the circumference of the bag mouth 40 accommodated is approximated by:

$$\text{circumference} = 2x + y_1 + y_2 - y_1(\cos \alpha_1) - y_2(\cos \alpha_2)$$

(assuming $y_1$ and $y_2$ are near the same length and $\alpha_1$ and $\alpha_2$ are near the same angle) From the foregoing equation it is observable that as the angles $\alpha_1, \alpha_2$ increase, the accommodating bag mouth 40 circumference (i.e. larger bag) increases and as the angles $\alpha_1, \alpha_2$ decrease, a smaller bag mouth 40 is usable. For arms 16 which substantially linearly extend or expand from said arm frame 14, the angles $\alpha_1, \alpha_2$ are fixed and the extending or expanding displacement is simply added to "x". In sum, said arms 16 have an ability to expand, provide a fitting, and increase to a circumference substantially defined by the sum of said length of said arms 16 plus a first distance between said first ends 15 of said arms plus a second distance between said second ends 42 of said arms 16. The aforesaid allows the present art to fit and hold a bag 30 having a mouth 40 of a plurality of sizes, whether internal or external to said mouth 40.

In operation, a user obtains a bag 30 having a mouth 40 of a similar size as the circumference of the partially or substantially fully collapsed or extended arms in combination with said arm frame 14 (i.e. according to the aforesaid equation) and inserts and fits said combination within the mouth 40 of said bag 30. (An alternative embodiment would attach via fasteners, clips, or adhesives said combination internally or externally to said mouth 40.) That is, the user forces or compresses at least one of said arms 16 toward said other arm 16 and attaches said arms 16 and said arm frame 14 with a mouth 40 of a bag 30. Upon release of the spring loaded pivoting arms 16, the arms 16 expand the bag 30 mouth 40 whereby the tension of said mouth 40 is substantially equal to the force of said spring loaded arms 16 and said bag 30 is held, held open, and retained via said arms 16 and the frictional force or attachment between the bag mouth 40 and the bag 30. If used in conjunction with said cart or dolly 28, the user first places and mates said bag holder 12 mounting hooks 22 with said mounting bracket 24 which is mounted with said cart or dolly 28 and then begins loading debris, lawn or garden waste, compost, etc. into said bag 30. If the user only partially fills the bag 30, the combination bag holder 12 and bag 30 may be removed and stored upon a or received with a mounting bracket 24 attached with a structure such as a garage or storage shed wall. Whether partially or completely filled, the dolly or cart 28 allows for easy and convenient transport of the bag 30 and contents, especially if the contents represent a collectively substantial mass. Upon filling, each spring loaded arm 16 is compressed toward the other and the bag 30 removed therefrom. The user may then properly dispose of the bag and contents, recycle, or compost as desired.

As stated, the present art is especially useful for conventional lawn and garden bags made from recyclable or biodegradable cellulose based material but may be used with any type of bag or bag material provided that the arm frame 14 and arms 16 are sized accordingly. As the present art specification states mounting, connecting, or attaching elements, reference is preferably made to welds but may be accomplished via a plurality of other methods including but not limited to fasteners, clamps, screws, frictional fits, or adhesives.

Those skilled in the art will appreciate that a lawn and leaf bag holder 10 apparatus and method of use and manufacture has been shown and described. Said present art is capable of allowing a single user to load, transport, and store fully or partially filled bags without the assistance others.

Having described the invention in detail, those skilled in the art will appreciate that modifications may be made of the invention without departing from its spirit. Therefore, it is not intended that the scope of the invention be limited to the specific embodiments illustrated and described. Rather it is intended that the scope of this invention be determined by the appended claims and their equivalents.

What is claimed is:

1. A bag holder comprising:
    an arm frame having a first end, a second end, a front, a rear, and a frame length; and
    a first arm formed into a substantially rectangular form having a first end, a second end, and a first length substantially between said ends; and
    a second arm formed into a substantially rectangular form having a first end, a second end, and a second length substantially between said ends; and
    said first end of said first arm substantially mounted with and extending from said arm frame near said first end of said arm frame and said first end of said second arm mounted with and extending from said arm frame near said second end of said arm frame; and
    one or more of said arms mounted with said arm frame whereby said arm has an ability to expand and increase a circumference substantially defined by the sum of said lengths of said arms plus said frame length plus a second distance substantially between said second end of said arms; and said arm frame and said arms in combination with said ability to expand capable of fitting a mouth of a conventional lawn and leaf bag of a paper material having a rectangular cross section and said mouth having a circumference approximately equal to two times said frame length plus said arm first length plus said arm second length; and one or more elastic separators coupled with at least one of said arms and provides a separating force between said arms wherein one or more of said arms may substantially expand and the combination of said arm frame and said arms fit within and frictionally hold said mouth in a tension and fully open with said rectangular cross section without deforming said mouth and hold said bag; and one or more mounts utilizing one or more mounting hooks mounted with said arm frame capable of mounting said arm frame with a structure or dolly or cart.

2. The bag holder as described in claim 1 whereby:
said one or more mounts are removable from said structure or dolly or cart.

3. The bag holder as described in claim 1 further comprising:
a mounting bracket mounted with said structure or dolly or cart, said mounting bracket capable of removably receiving one or more of said mounts.

4. The bag holder as described in claim 1 whereby:
said ability to expand of one or more of said arms is via a pivot relative to said arm frame.

5. The bag holder as described in claim 4 whereby said one or more elastic separators comprise:
one or more springs positioned between at least one of said arms and said arm frame.

6. The bag holder as described in claim 5 further comprising:
one or more pivot shafts retained with said arm frame or arm; and
one or more bores capable of receiving said pivot shaft and attached with said arm frame or with said arms near said first end of said arms.

7. The bag holder as described in claim 5 further comprising:
one or more pivot shafts pivotally retained within one or more frame bores attached with said frame and one or more arm bores attached with said arms near said first end of said arms.

8. The bag holder as described in claim 6 whereby:
one or more of said springs comprise a torsion spring mounted upon one or more of said pivot shafts and seated upon one or more seat surfaces on said arm or arm frame.

9. The bag holder in claim 8 further whereby:
one or more of said mounts comprise said mounting hook having a hook end which mates with a mounting hole of a mounting bracket and is formed in a canted position away from a parallel with a plane of said arm frame whereby said arms maintain a position which assures that said bag remains substantially vertical.

10. The bag holder as described in claim 8 further comprising:
a narrowed height portion on one or more of said arms near said first end of said arm whereby said spring may fit between and engage said arm frame and said arm without substantially interfering with the contour of the arm.

11. A bag holder comprising:
an arm frame having a first end, a second end, a front, a rear, and a length; and
a first pivotable arm formed into a substantially rectangular form having a first end, a second end, and a first length and pivotally attached at said first end of said arm frame; and
a second pivotable arm formed into a substantially rectangular form having a first end, a second end, and a second length and pivotally attached at said second end of said arm frame; and
a first spring between said first pivotable arm and said arm frame; and
a second spring between said second pivotable arm and said arm frame, said springs providing a separating expanding force between said arms which promotes an increase in a circumference substantially defined by the sum of said lengths of said arms plus said length of said arm frame plus a second distance substantially between said second end of said arms; and
said arm frame and said arms capable of fitting within a mouth of a conventional lawn and leaf bag of a paper material having a rectangular cross section and said mouth having a circumference approximately equal to two times said frame length plus said arm first length plus said arm second length; and
said separating expanding force allowing said arm frame and said arms fit within and frictionally hold said mouth in a tension and fully open with said rectangular cross section without deforming said mouth and hold said bag; and
one or more mounting hooks each having a hook end and mounted on said arm frame and extending from said rear; and
a mounting bracket mounted with a structure, cart, or dolly and having one or more mounting holes removably mated with said hook end of said mounting hook, whereby said mouth of said bag may be held open without deforming said mouth and retained via said tension provided by said separating force of said arms and thereafter said bag may be filled, stored, or transported.

12. The bag holder as described in claim 11 whereby:
said pivotable arms each comprise an arm bore at said first end of said arms; and
said arm bore pivotally mated with a pivot shaft retained with said arm frame.

13. The bag holder as described in claim 12 whereby:
said pivot shaft is retained with said arm frame via frame bores within said first end and said second end of said arm frame and via shaft retainers upon said pivot shaft.

14. The bag holder as described in claim 11 whereby:
said springs comprise torsion springs seated upon said arm frame and said arms.

* * * * *